United States Patent
Escursell et al.

(10) Patent No.: US 10,967,468 B2
(45) Date of Patent: Apr. 6, 2021

(54) MACHINE FOR GLUING A WORKPIECE TO A SUPPORT ELEMENT PRIOR TO MACHINING OPERATIONS AND A METHOD FOR THE SAME

(71) Applicant: Aktiebolaget SKF, Gothenburg (SE)

(72) Inventors: Marcel Escursell, Gothenburg (SE); Stig Giaever, Ljungskile (SE); Sture Johansson, Angered (SE)

(73) Assignee: Aktiebolaget SKF, Gothenburg (SE)

( * ) Notice: Subject to any disclaimer, the term of this patent is extended or adjusted under 35 U.S.C. 154(b) by 68 days.

(21) Appl. No.: 16/357,519

(22) Filed: Mar. 19, 2019

(65) Prior Publication Data
US 2019/0329369 A1    Oct. 31, 2019

(30) Foreign Application Priority Data

Apr. 25, 2018   (FR) .................................. 1853620

(51) Int. Cl.
| | | |
|---|---|---|
| *B29C 65/48* | (2006.01) | |
| *B23Q 3/08* | (2006.01) | |
| *B29C 65/14* | (2006.01) | |
| *B29C 65/76* | (2006.01) | |

(52) U.S. Cl.
CPC .......... *B23Q 3/084* (2013.01); *B29C 65/1406* (2013.01); *B29C 65/4845* (2013.01); *B29C 65/76* (2013.01)

(58) Field of Classification Search
CPC .. B29C 65/76; B29C 65/4845; B29C 65/1406
See application file for complete search history.

(56) References Cited

U.S. PATENT DOCUMENTS

| | | | |
|---|---|---|---|
| 7,172,676 B2 | 2/2007 | Demeter | |
| 2004/0026023 A1* | 2/2004 | DeMeter | B29C 65/1664 156/247 |
| 2004/0134590 A1* | 7/2004 | Caldana | B23Q 3/084 156/154 |
| 2012/0000601 A1* | 1/2012 | Fessler-Knobel | B23Q 3/084 156/275.5 |
| 2017/0304984 A1* | 10/2017 | Savoie | B29D 11/00442 |

FOREIGN PATENT DOCUMENTS

| | | |
|---|---|---|
| EP | 2007547 A1 | 12/2008 |
| EP | 2543470 A2 | 1/2013 |
| WO | 03057392 A1 | 7/2003 |
| WO | 2007118761 A1 | 10/2007 |
| WO | 2016014482 A1 | 1/2016 |

* cited by examiner

*Primary Examiner* — Daniel McNally
(74) *Attorney, Agent, or Firm* — Garcia-Zamor Intellectual Property Law; Ruy Garcia-Zamor; Bryan Peckjian (57) ABSTRACT

A machine for gluing a ring-shaped workpiece prior to machining operations. The machine includes a support assembly adapted to receive a removable support element having a top surface for receiving a workpiece; a glue dispenser system adapted to apply a predefined amount of glue on a face of at least one of the workpiece and the support element; a gripper assembly for placing a workpiece on the support element; an illuminating system adapted to illuminate the applied glue with ultraviolet light, this illuminating system including: at least one inner lighting element for radially illuminating an inner radial face of the ring-shaped workpiece with ultraviolet light, and at least one outer lighting element for radially illuminating an outer radial face of the ring-shaped workpiece with ultraviolet light.

10 Claims, 5 Drawing Sheets

MACHINE FOR GLUING A WORKPIECE TO A SUPPORT ELEMENT PRIOR TO MACHINING OPERATIONS AND A METHOD FOR THE SAME

CROSS-REFERENCE

This application claims priority to French patent application no. 1853620 filed on Apr. 25, 2018, the contents of which are fully incorporated herein by reference.

TECHNOLOGICAL FIELD

The present invention relates to a machine and a method for gluing a workpiece to a support element prior to machining operations.

The invention more generally relates to the manufacturing of mechanical workpieces by removal of matter, i.e. by subtractive manufacturing methods, such as hard turning, and more specifically to the manufacturing of bearing rings.

BACKGROUND

It is known to manufacture mechanical workpieces using a so-called grinding process, which include a succession of grinding operations performed on a workpiece using several different machines. However, grinding processes are long to implement, which is a serious drawback if the production runs are short. They require the definition of numerous application-specific settings, which make them complicated to implement in industrial settings. Furthermore, they may lead to burning abuses and cause permanent damage to the workpiece.

To avoid these drawbacks, it is known to manufacture workpieces using a so-called hard turning process, in which all the shaping operations of the workpiece by removal of matter are performed on a single machine. The manufacturing process is thus shortened and the risk of burning abuses is reduced. However, in order to achieve satisfactory geometrical accuracy of the machined workpiece, the workpiece must be firmly held in place during machining. In practice, the workpiece is held by at least one of its faces, for example using a magnetic clamping tool, or using instant glue such as cyanoacrylate to hold a face of the workpiece on a flat rigid substrate.

If the workpiece is a ring-shaped mechanical piece meant to be used in a bearing ring, then the workpiece may be held by its lower face or by its upper face, while the outer and inner radial faces and the remaining face are machined.

However, these known methods have some drawbacks. In some cases, the workpieces may be too small to be adequately clamped by magnetic clamping tools, thus increasing the risk of unwanted movement during machining. As for gluing the workpiece with instant glue, there is a risk that, when the workpiece is removed from the substrate once the machining operations are completed, then the released residual forces in the workpiece may cause a distortion of the workpiece, resulting in unacceptable circularity errors. There is also a risk of distortion of the glued face.

U.S. Pat. No. 7,172,676 discloses using UV-curable glue for joining a workpiece to a fixture that has UV transparent fixation points. However, in some applications, it is not always possible to use a fixture with transparent fixation points.

SUMMARY

There is thus a need for a machine and a method for gluing a workpiece prior to machining operations, in which the workpiece to be machined is held in place so as to minimize the risk of unwanted movement while avoiding unwanted deformations of the workpiece.

To that end, the invention relates to a machine for gluing a ring-shaped workpiece prior to machining operations, wherein the machine includes:

a support assembly adapted to receive a removable support element having a top surface for receiving a workpiece;

a glue dispenser system adapted to apply a predefined amount of glue on a face of at least one of the workpiece and the support element;

a gripper assembly for placing a workpiece on the support element;

an illuminating system adapted to illuminate the applied glue with ultraviolet light, this illuminating system including:

at least one inner lighting element for radially illuminating an inner radial face of the ring-shaped workpiece with ultraviolet light, and at least one outer lighting element for radially illuminating an outer radial face of the ring-shaped workpiece with ultraviolet light.

In the above machine, using ultraviolet light-activated glue instead of instant glue reduces the risk of unwanted deformation of the workpiece both during machining operations and after machining operations when the workpiece needs to be removed from the pallet. In addition, radially illuminating the glue both from the inner face and the outer face of the ring-shaped workpiece allows a better curing of the glue, thus reducing the risk of surface defects on the glued face of the workpiece.

According to advantageous aspects and embodiments, the invention comprises one or more of the following features, considered alone or according to all possible technical combinations:

The applied glue is high viscosity ultra-violet light-activated glue.

The inner and outer lighting elements each include an ultraviolet light source comprising one or several fluorescent lamp tubes, or light-emitting diodes, or halogen lamps, or gas-discharge lamps.

The lighting system includes an inner lighting structure including at least one inner lighting element and an outer lighting structure including at least one outer lighting element, the inner and outer lighting structure having an annular or toroidal shape, the inner lighting structure having a smaller radius than the outer lighting element, the inner and outer lighting structures being adapted to be aligned with the workpiece around a same alignment axis.

The gripper assembly includes an arm provided with at least one magnetic element for exerting a magnetic force on at least a portion of the workpiece, in order to attract and hold the workpiece attached to the gripper assembly.

The machine further includes a measurement system adapted to detect a position error of the workpiece relative to the support element, the measurement system including at least one position measurement device comprising optical recognition means, such as an image sensor or a light sensor.

The machine further includes a robotic arm for loading and unloading the support element and/or for loading and unloading the workpiece.

The workpiece is a metal ring meant to be used in a bearing, preferably a ball bearing.

According to another aspect, the invention relates to an industrial production line comprising a gluing machine and a machining tool, the gluing machine being adapted to glue a workpiece to be machined onto a removable support element prior its transfer to the machining tool, the machining tool being adapted to perform machining operations on the workpiece glued to the support element, wherein the gluing machine is as previously mentioned.

According to another aspect, the invention relates to a method for gluing a workpiece prior to machining operations using the gluing machine as previously described, wherein this method includes:

a) providing a removable support element having a top surface for receiving a workpiece and placing the support element on the support assembly;

b) providing a ring-shaped workpiece to be machined;

c) gluing the workpiece to the support element, by:

applying a predefined amount of glue on a face of at least one of the workpiece and the support element, using the glue dispenser system;

bringing in contact the workpiece with the support element, along the face comprising the applied glue, using the gripper assembly;

d) illuminating the applied glue with ultraviolet light, using the illuminating system, by radially illuminating both the inner radial face and the outer radial face of the ring-shaped workpiece, respectively using an inner lighting element and an outer lighting element of the lighting system.

BRIEF DESCRIPTION OF THE DRAWINGS

The invention will be better understood upon reading the following descriptions, provided solely as examples, and made in reference to the appended drawings, in which.

DETAILED DESCRIPTION

Figure 1:
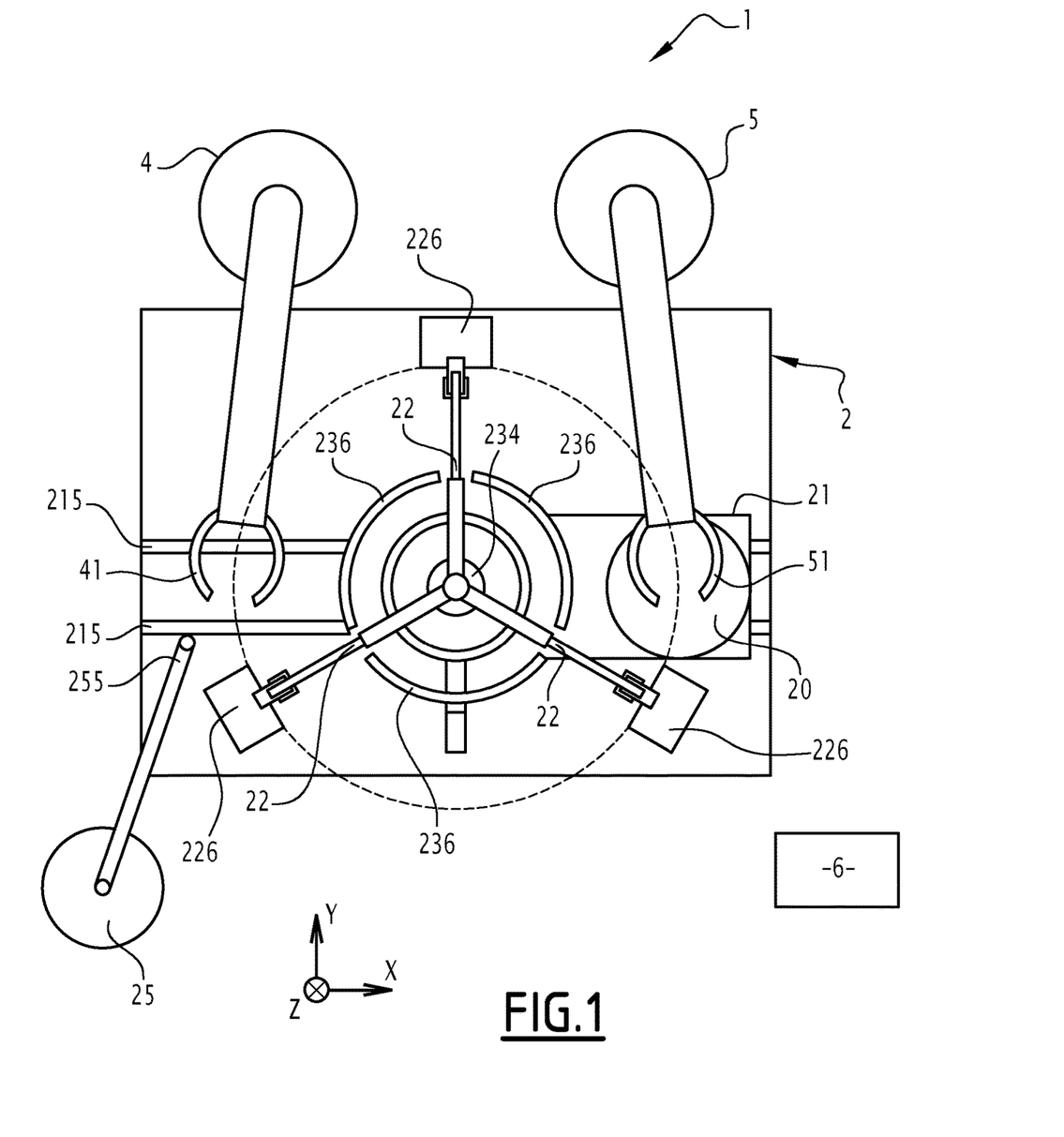
FIG. 1 is a simplified representation of an exemplary machine according to the invention for gluing a workpiece prior to machining operations, illustrated in a top view.
Figure 2:
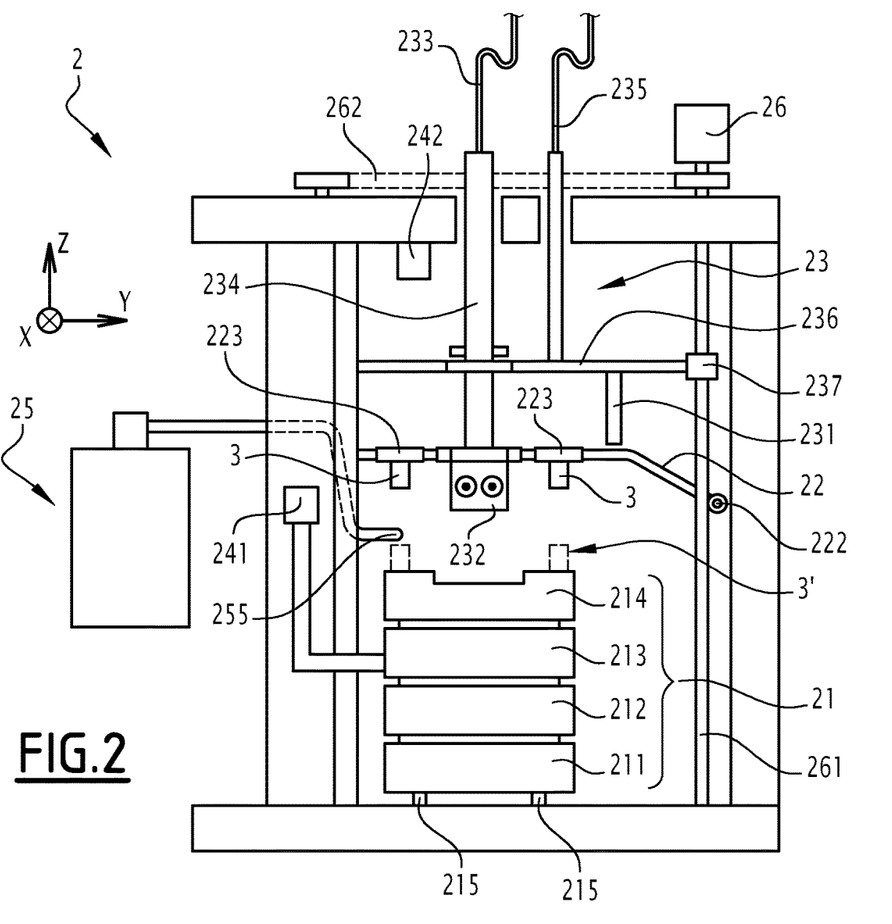
FIG. 2 is a simplified representation of the machine of FIG. 1, illustrated in a lateral view.
Figure 3:
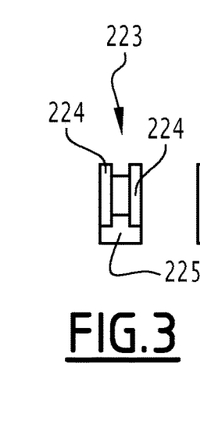
FIG. 3 and FIG. 4 are simplified illustrations of a magnet gripper assembly belonging to the machine of FIGS. 1 and 2.

FIGS. 1 and 2 illustrate a portion of a production line 1 for manufacturing mechanical workpieces. The production line 1 includes a machine 2 for gluing a workpiece 3, for example prior to machining operations.

According to preferred embodiments, the mechanical workpieces are ring-shaped. In this example, the workpieces are made of metal.

In this illustrative example, the production line 1 is configured to manufacture bearing rings, preferably bearing rings for aerospace applications. In that case, the workpieces are metal rings that are meant to be used in bearings, preferably in ball bearings.

In this description, as an example, a ring-shaped workpiece has a hollow cylindrical shape centered on a longitudinal central axis. The workpiece extends, along the longitudinal central axis, between an upper flat face and a lower flat face. The workpiece extends radially between a circular inner radial face and a circular outer radial face. The radial direction is perpendicular to the longitudinal central axis. The inner radial face and the outer radial face are centered on the longitudinal central axis and are arranged coaxially around each other and around the longitudinal central axis. The radius of the outer face is higher than the radius of the inner face. The height of the workpiece, measured along the longitudinal central axis, is preferably equal or lower than the radius of the outer face. The workpiece may include a flange portion.

According to some embodiments of the invention, the production line 1 includes a heat treatment station, a gluing station, a machining station, and an assembly station for assembling a final product based on the workpiece. The production line 1 may also include an inspection station for performing quality control of the machined workpiece. The production line may also include a washing station for cleaning the workpiece after ungluing and before subsequent steps, especially before the final assembly.

The workpiece 3 is manufactured by successively being subjected to specific operations in each station. For example, the workpiece is first is subjected to a heat treatment in the heat treatment station. Then, the workpiece is transferred to the gluing station, where one of its lower or upper faces is glued on a support structure, such as a pallet, an example of which will be described later on. Then, the workpiece 3 is transferred to the machining station where it is machined by removing matter with the machining tool, preferably using a hard turning process, although other subtractive manufacturing processes may be used instead, such as electrical discharge machining. For example, some matter belonging to the workpiece is selectively removed from the workpiece in order to define the shape of the inner face and of the outer face.

Once the machining is over, the workpiece is unglued from the support element and may be transferred to the inspection station and/or to the washing station.

Finally, the workpiece is transferred to the assembly station, where a final piece is assembled using the machined workpiece. For example, if the final piece to be assembled is a bearing, then the bearing is assembled during this final step in the assembly station, by assembling the ring-shaped workpiece with other bearing components such as a casing and rolling elements such as balls or needles.

The production line 1 may be automated, either partially or entirely.

In the above example, the machine 2 is associated to the gluing station for performing gluing operations in order to hold the workpiece during the subsequent machining operations. It is however understood that the machine 2 may be used independently from the exemplary production line 1 described above.

The machine 2 also includes a first robot arm 4 and a second robot arm 5. In other embodiments, the robot arms 4 and 5 are part of the production line 1 instead of being part of the machine 2.

The robot arm 4 is adapted to load and unload, on the machine 2, a support element 214 for receiving the workpiece 3. The robot arm 4 is adapted to load and unload a workpiece 3 on the support element 214. The robot arms 4 and 5 include, on their respective distal extremity, a gripper tool 41 and 51.

For example, the robot arm 4 is configured to grab a support element 214 from a storage space and to load this support element 214 on the machine 2. The robot arm 4 is further configured to remove the support element 214 after the gluing operations are over, for example in order to transfer the support element 214 and the workpiece 3 to the next station(s) of the production line 1, for example to a machining station. The robot arm 5 is configured to grab a workpiece 3 from a storage zone of the production line 1 located upstream of the machine 2, and to load the workpiece 3 on the storage element 214. For example, the storage zone is an area or a storage unit where workpieces 3 are stored temporarily prior to the gluing operation, e.g. after they have undergone the heat treatment operations.

Embodiments of the machine 2 may further include a programmable command unit 6. For example, the command unit 6 includes an electronic central processing unit as well as a computer memory, preferably a non-volatile computer memory. The memory stores machine-readable executable instructions meant to be executed by the central processing unit for automatically operating the machine 2. The unit 6 is connected to the machine 2 through a communications data bus, such as a field bus, or through a wired data link, or even wirelessly. In some embodiments, the unit 6 may be instead part of the production line 1. The robot arms 4 and 5 may be driven by the unit 6 or, alternatively, by a separate command unit that is nonetheless coordinated with the unit 6.

As illustrated in FIGS. 1 and 2, the machine 2 includes a movable support assembly 21, a magnet gripper assembly 22, a lighting system 23, a position and alignment measurement system 24, a glue dispenser system 25 and at least one main motor 26 for moving the lighting system 23 and the gripper assembly 22. Preferably, these elements of the machine 2 are adapted to be commanded automatically by the unit 6. In the illustrated example, reference "Z" denotes a fixed vertical axis and references "X" and "Y" denote two fixed horizontal axes perpendicular to each other and to the vertical axis Z.

The support assembly 21 is adapted to receive the removable support element 214, also named pallet 214, for receiving a workpiece 3. The support assembly 21 is adapted to move the workpiece 3 along several degrees of freedom in a controlled manner, for example in translation along axes X and Y and in rotation along axis Z. The support assembly 21 is movable relative to a fixed frame of the machine 2.

In this example, the support assembly 21 includes, stacked onto each other along the Z axis, in ascending order: a main slide table 211, a cross slide table 212, a rotation table 213 and the removable pallet 214 placed onto the rotation table 213. For example, the main slide table 211 is adapted to move along the X axis, by sliding along guiding means 215, such as one or several rails or racks, laid on a floor of the machine 2 or attached to the fixed frame of the machine 2. Preferably, the main slide table 211 is adapted to move in translation along the X axis across the machine 2 between loading/unloading zones which may be near or next to other stations of the production line 1. The table 212 moves along the Y direction relative to the table 211. The table 213 rotates around the Z axis relative to the table 212. The movement of the tables 211, 212 and 213 is actuated by motor elements, such as stepper motors.

Figure 5:
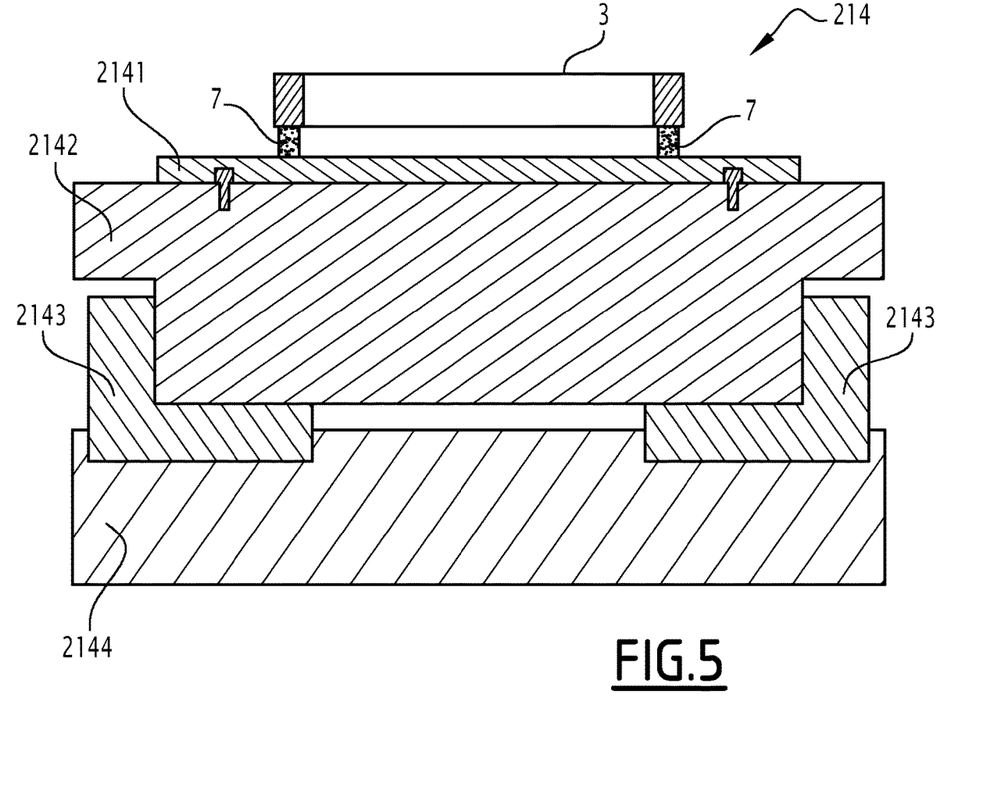
FIG. 5 is a simplified representation of a pallet of the machine of FIGS. 1 and 2 for holding a workpiece to be machined, illustrated in a cutout view along a transverse section.

FIG. 5 illustrates an exemplary embodiment of the pallet 214. The pallet 214 includes a top side 2141, also named top surface 2141, a bottom side 2142, jaws 2143 and a high precision air chuck 2144. The top side 2141 is a flat surface onto which the workpiece 3 can be glued by applying a predefined quantity of glue 7 between one of the lower or upper face of the workpiece 3 and corresponding regions of the top side 2141. In the illustrated example, the space between the workpiece 3 and the top side 2141 is exaggerated for illustrative purposes. In practice, however, the space between the workpiece 3 and the top side 2141 may be smaller. The top side 2141 is fixed on top of the bottom side 2142. The jaws 2143 couple mechanically, in a removable fashion, the bottom side 2142 with the chuck 2144. The chuck 2144 is adapted to be removably attached on top of the rotation table 213 of the support assembly 21, for example using air pressure to hold the chuck 2144 on the table 213.

In this example, when the workpiece 3 is in position on the pallet 214, the upper and lower faces of the workpiece 3 are parallel with the geometrical plane defined by the axes X and Y. The longitudinal central axis of the workpiece 3 is aligned parallel with the axis Z.

Referring back to FIGS. 1 and 2, the magnet gripper assembly 22 is adapted to hold the workpiece 3 after it has been loaded in the machine 2 by the robot arm 4, and also to move the workpiece 3 in translation along the Z axis. The gripper assembly 22 includes at least one arm 211 and arm guiding means 222 for moving the arms 221 along the Z axis.

In this example, the arm guiding means 222 are provided at a distal end of each arm 221. For example, arm guiding means 222 include wheels or rolling elements that cooperate with guiding structures 226, such as guiding bars. The guiding structures 226 are arranged vertically along the axis Z. Each arm 221 is associated to a guiding structure 226. According to some embodiments, the movement of the gripper assembly 22 along the Z axis is driven by the movement of the lighting system 23, as will be explained in what follows.

In this embodiment, the gripper assembly 22 includes three such arms 221. The number of guiding structures 226 is here equal to three. As can be seen in FIG. 1, the arms 221 are preferably arranged in a star pattern, with their respective proximal end converging towards a central point, while radially extending outwardly away from this central point so that their distal ends are arranged along a circle centered on the central point and lying in the geometrical horizontal plane defined by axes X and Y. For example, the arms 221 are spaced equidistantly, e.g. with a separation angle of 120° between two adjacent arms 221. Other arrangements are possible.

In the illustration of FIG. 2, the workpiece 3 is shown attached to the magnetic gripper assembly 2, prior to its gluing to the pallet 214. The workpiece 3 is illustrated in a cutout view. The reference 3' indicates the position occupied by the workpiece 3 once it is glued to the pallet 214.

Figure 4:
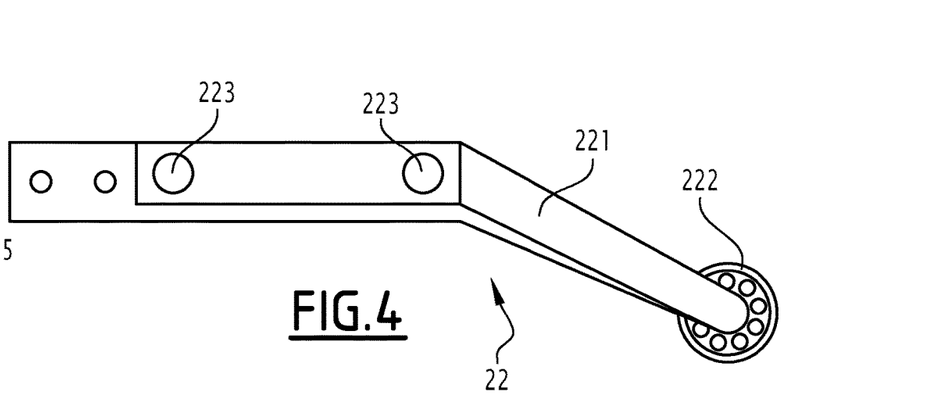

As illustrated in FIG. 4, each arm 221 includes one or several magnetic elements 223 which are meant to exert a magnetic force on at least a portion of the workpiece 3, in order to attract and hold it attached to the gripper assembly 22. The spatial arrangement of the magnetic element(s) 223 (and of the arms 221) is chosen depending on the shape and the dimensions of the workpiece 3.

For example, each arm 221 includes a main portion having a longitudinal shape. Each arm 221 carries the magnetic element(s) 223. In the illustrated example, each arm 221 includes two magnetic elements 223 which are arranged on this main portion aligned with each other. In practice, a same machine 2 may be used with workpiece of different dimensions. Therefore, several magnetic elements 223 may be placed on each arm 221 depending on these different dimensions, meaning that only some of the magnetic elements 223 of an arm 221 may be used during operations performed on a workpiece 3.

The magnetic elements 223 are preferably permanent magnets. In alternative embodiments, the magnetic elements 223 are electromagnets.

As illustrated in the exemplary embodiment of FIG. 4, each magnetic element 223 is preferably an assembly including at least one piece of magnetic material 224, preferably two such pieces 224, and a non-magnetic element 225, for example forming a support structure or body of the magnetic element 223. For example, the magnetic material 224 is iron and the non-magnetic element 225 is brass. Other materials can be chosen.

Referring back to FIGS. 1 and 2, the lighting system 23 is adapted to illuminate the workpiece 3, preferably with ultraviolet light, after the glue 7 has been applied between the workpiece 3 and the pallet 214.

To this end, the lighting system 23 includes at least one outer lighting element 231, at least one inner lighting element 232 and a support structure onto which the outer and inner lighting elements 231, 232 are mounted.

The inner lighting elements 232 are adapted to radially illuminate the inner face of the workpiece 3, i.e. to emit light along a radial direction of the workpiece 3. When the workpiece 3 is in position on the pallet 214, the inner lighting elements 232 are at least partially received inside the central hollow core of the ring-shaped workpiece 3.

The outer lighting elements 231 are adapted to radially illuminate the outer face of the workpiece 3, i.e. to emit light along a radial direction of the workpiece 3. When the workpiece 3 is in position on the pallet 214, the outer lighting elements 231 surround the external periphery of the workpiece 3.

In the illustrated example, the inner lighting elements 232 are attached to a central portion 234 of the support structure of the lighting system 23. The outer lighting elements 231 are located on an outer portion 236 of the support structure and surrounding the central portion 234. For example, the outer lighting structure 236 has a curved shape. The outer lighting structure 236 is preferably arranged coaxially around the inner lighting structure. For example, both the central structure 234 and the outer lighting structure 236 are centered on the central point around which the arms 221 of the gripper assembly 22 are arranged. The outer portion 236 may move relative to the central portion 233.

According to some embodiments, the lighting elements 231, 232 each include a light source, preferably an ultraviolet light source, including one or several fluorescent lamp tubes, or light-emitting diodes, or halogen lamps, or gas-discharge lamps, or any other appropriate ultraviolet light source. The light sources are powered by an external power unit, connected to the light sources of the outer lighting elements 231 by means of first electrical cables 235 and to the inner lighting elements 232 by means of second electrical cables 233. Operation of the light sources is preferably commanded by the unit 6.

According to preferred embodiments of the invention, the lighting system 23 is movable in translation along the Z axis. The displacement of the lighting system 23 is provided by the main motor(s) 26, such as electrical motors.

For example, the motor(s) 26 is (are) attached to the frame of the machine 2 and is (are) adapted to provide a rotational movement to the structures 261 which, in that case, may be shafts adapted to rotate along their longitudinal axis relative to the fixed frame of the machine 2. Alternatively, the rotational movement may be transmitted differently. The structures 261 may be fixed and a separate rotatable transmission element is used instead.

The rotational movement provided by the motor(s) 26 is transformed into a translational movement along the Z axis using transmission devices 237 which are attached to the support structure of the lighting system 23. For example, the transmission devices 237 include threaded rods with nuts.

In some embodiments, a single motor 26 has its output shaft directly coupled to one of the structures 216 and indirectly coupled to the other structures 216 by means of mechanical transmission devices 262 such as a chain or a timing belt or any appropriate mechanical linkage.

Preferably, the support structure of the lighting system 23 is partially mechanically coupled with the gripper assembly 22, for example using selective mechanical engagement elements such as hooks or retention portions. For example, when the support structure of the lighting system 23 moves upwards along the Z axis, it engages with the gripper assembly 22. As a result, the gripper assembly 22 is lifted and moves upwards along the Z axis. When the support structure moves downwards along the Z axis, it disengages from the gripper assembly 22. As a result, the gripper assembly 22 moves back downwards along the Z axis under its own weight.

In some other embodiments, however there is no such mechanical coupling between the gripper assembly 22 and the lighting system 23. The outer lighting elements 231 carried by the outer structure 236 are mechanically decoupled from the gripper assembly 22 when moving in translation along the Z axis, more particularly when the lighting element 231 is lowered. This is especially the case in embodiments where the guide structure 226 is used to guide the gripper assembly 22. An advantage of this is that the position of the workpiece 3 in the X and Y directions can be adjusted independently and with a greater precision.

The measurement system 24 is adapted to measure the position of the workpiece 3 in order to detect any radial misalignment or any deviation relative to a target position.

In the illustrated example of FIG. 2, the measurement system 24 includes at least one position measurement device such as a centering measurement device 241 and/or a position measurement device 242. For example, the position measurement devices 241 and/or 242 include optical recognition means, such as an image sensor or a light sensor. Optionally, the position measurement devices 241 and/or 242 may include a light source, such as a laser module, adapted to project light on at least a predefined region of the workpiece 3. The corresponding reflected light is then measured by the optical recognition means in order to acquire an information on the relative position of the workpiece 3.

The measurement system 24 also includes a programmable data processing unit adapted to acquire the position-related data measured by the measurement devices 241 and 242 and, in response, to detect a position error of the workpiece 3 based on the measurements and based on predefined position tolerance values. In some embodiments, the processing unit is part of the unit 6 and may be implemented using software means. In some other embodiments, the data processing unit includes a dedicated signal processing electronic circuit.

On some cases, the measurement system 24 may be built differently or may even be omitted.

Figure 6:
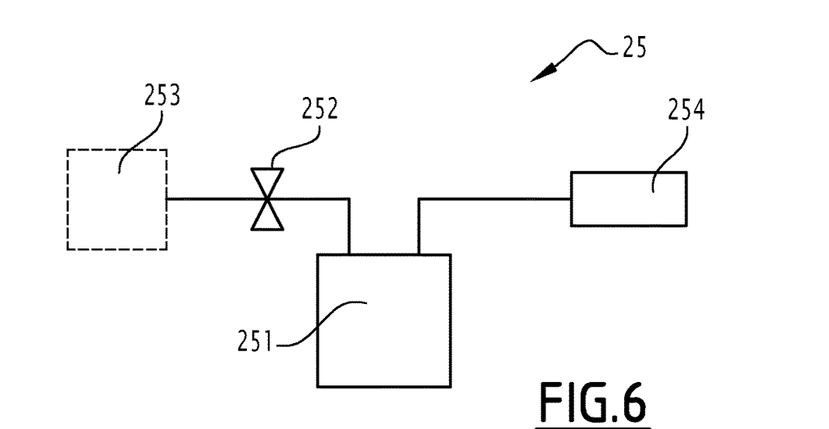
FIG. 6 is a schematic representation of an automated glue dispenser system belonging to the machine of FIGS. 1 and 2.

Referring now to FIGS. 1, 2 and 6, the glue dispenser system 25 is adapted to apply, in a controlled manner, a predefined quantity of glue onto the pallet 214 in order to glue the workpiece 3 to the pallet 214. The glue is stored in at least one glue reservoir 251.

Preferably, the glue is ultraviolet-light activated glue. In some embodiments, the glue is high viscosity glue, e.g. glue with a viscosity equal to or higher than 100 000 cP.

In the illustrated embodiment of FIG. 6, the glue dispenser system 25 includes a glue reservoir 251, an air pressure regulator 252, a compressed air source 253, an electronic controller 254 and a glue applicator 255. The glue applicator 255 is adapted to be positioned near or next to the pallet 214 for delivering glue coming from the reservoir 251. The glue applicator 255 includes an orifice fluidically connected to the reservoir 251 through which the glue can flow out. The glue is brought from the reservoir 251 towards the glue applicator 255 by injecting, in the reservoir 251, compressed air coming from the compressed air source 253. The regulator 252 limits and regulates the flow of compressed air coming from the source 253. The dispenser system 25 may include a valve for regulating and even interrupting the flow of glue coming from the reservoir 251 towards the applicator 255. The controller 254 commands the regulator 252 and, wherever applicable, the valve, using electro-mechanical means, for example according to command signals received from the unit 6.

In some embodiments, the glue dispenser 25 is adapted to store two different kinds of glues. For example, the glue reservoir 251 is divided in two separate compartments. In other embodiments, the glue dispenser system 25 includes several glue reservoirs 251, each being associated to a kind of glue. In any case, the architecture of the glue dispenser system 25, and especially the fluid connections between the reservoirs 251 and the applicator 255 are adapted in consequence.

An example of operation of the machine 2 is now described in reference to FIGS. 1 to 6. It is however understood that other embodiments are possible and especially that the sequence of steps may be executed in a different order.

First, a pallet 214 is provided and is loaded in the machine 2. For example, the robot arm 4 picks, using its gripper tool 41, a free and clean pallet 214 from a storage space. The robot arm 4 moves the pallet 214 towards the machine 2 and places the pallet 214 on top of the table 213. The robot arm 4 then returns to its resting position.

Then, a workpiece 3 to be machined is provided and loaded in the machine 2. For example, the robot arm 5 picks, from a storage space, using its gripper tool 51, a workpiece 3 to be machined. The robot arm 5 moves the workpiece 3 towards the machine 2 and places it on the mobile support assembly 21 or on a loading table 20 that is separate from the pallet 214. For example, the loading table 20 is placed on top of the table 213 while being nonetheless separate from the pallet 214.

During these operations, the support assembly 21 may move along the X axis between loading/loading zones, e.g. close to the robot arms 4 and 5. For example, during loading of the pallet 214, the support assembly 21 moves towards the robot arm 4 to facilitate the positioning of the pallet 214 on the table 213. Then, during the loading of the workpiece 3, the support assembly 21 moves towards the robot arm 5, here in an opposite direction, in order to facilitate the positioning of the workpiece 3. This movement of the support assembly 21 is particularly useful is the respective bases of the robot arms 4 and 5 are fixed relative to the frame of the machine 2 and/or if the range of the robot arms 4, 5 is limited. One therefore understands that the movement of the support assembly 21 is coordinated with the movement of robot arms 4 and 5. For example, this movement is coordinated by the unit 6 using predefined programs.

The rotation table 213 now rotates one complete turn or slightly less, together with the measuring device 241. During this rotation it is checked that the ring is concentric, within specified limits, with the pallet. If so, the deviations in x and y directions are compensated by moving the slide tables 211 and 212 slightly, by an amount calculated by the control unit 6 during the one-turn rotation. The movement may be postponed until after the glue is applied but before joining the surfaces.

If the ring is not concentric with the pallet, the last operations are reversed, and the rejected ring is returned to a temporary storage place on the input side for manual handling, using the robot 5, and a new ring is chosen. In order to unclamp the ring from the permanent magnet assembly 22, an (optional) electromagnet in the table 20 is temporarily activated.

Then, the workpiece 3 is glued to the pallet 214. For example, a predefined amount of glue 7 is applied by the glue dispenser system 25, on at least one of the pallet 214 or the workpiece 3. Preferably, the glue is applied directly on the pallet 214, here on the top side 2141, although in some embodiments, the glue is applied to one of the lower or upper faces of the workpiece 3.

For example, the support assembly 21 slides so as to align the pallet 214 with the glue applicator 255. The system 25 delivers the amount of glue through the applicator 255, preferably by dropping glue at predefined positions of the pallet 214. In some embodiments, the glue applicator 255 may be automatically moved in order to drop the glue at predefined locations of the pallet 214.

In an exemplary embodiment, the application of glue is performed before above-described step of loading the workpiece 3, i.e. right after loading the pallet 214. Other embodiments are nonetheless possible.

After application of the glue 7, the pallet 214 and the workpiece 3 are brought in contact with each other so as to be glued together.

For example, the support assembly 21 slides so as to align the support table 20 with the central point of the gripper assembly 22. The gripper assembly 22 is lowered along the Z axis until the magnetic elements 223 are sufficiently close to the workpiece 3 so as to exert a magnetic force capable of attracting the workpiece 3 and holding it to the assembly 22. At this point, the workpiece 3 becomes joined to the assembly 22, in contact with the arms 221, and can be lifted by the gripper assembly 22.

For example, the movement of the gripper assembly 22 along the axis Z is performed thanks to a corresponding movement of the lighting system 23 under the action of the motor(s) 26 as described above. The workpiece 3 is lifted sufficiently above the loading table 20 so as to allow a further movement of the support assembly 21.

The support assembly 21 then slides back until the pallet 214 becomes aligned with the central point of the gripper assembly 22. The gripper assembly 22 is again lowered, in order to bring the lower face of the workpiece 3 in contact with the pallet 214. More precisely, the lower face of the workpiece 3 is brought into contact with the glue 7 deposited on the pallet 214.

Once the workpiece 3 and the pallet 214 are in contact together, the inner and outer faces of the workpiece 3 are lit with ultraviolet light, using the lighting system 23, in order to cure the glue 7. For example, the central portion 234 and the outer portion 236 are brought in alignment with the corresponding inner and outer faces of the workpiece 3, respectively, and the lighting elements 231 and 232 are activated so as to illuminate the corresponding faces. Preferably, the vertical position of the lighting elements 231 and 232 is coincident with the region where the applied glue 7 is located.

The lighting may be applied continuously for a predefined duration, for example equal or higher than thirty seconds, or equal or higher than one minute.

The glue 7 cures under the influence of the ultraviolet light received from both inner and outer faces. Once the lighting is over, the glue 7 has sufficiently cured so as to guarantee a good degree of mechanical bonding between the workpiece 3 and the pallet 214.

Thanks to the invention, using ultraviolet light-activated glue instead of instant glue reduces the risk of unwanted deformation of the workpiece both during machining operations and after machining operations when the workpiece needs to be removed from the pallet. In addition, radially illuminating the glue both from the inner face and the outer face of the ring-shaped workpiece allows a better curing of the glue, thus reducing the risk of surface defects on the glued face of the workpiece.

The workpiece 3 is less likely to move during subsequent machining steps and is less likely to exhibit the kind of distortion-related defects one is likely to encounter when the workpiece 3 is directly glued using instant glues such as cyanoacrylate. Illuminating the glue 7 from both the inner and outer sides guarantees a better and more uniform curing of the glue 7.

The pallet 214 carrying the glued workpiece 3 may then be unloaded from the machine 2, for example to be transferred to a machining station of the production line 1.

For example, the lighting system 23 and the gripper assembly 22 are lifted along the Z axis. At this point, the bond created by the glue 7 between the workpiece 3 and the pallet 214 is sufficient to exert a mechanical resistance which exceeds the magnetic force exerted by the magnetic elements 233. Thus, the workpiece 3 is pulled away and detaches itself from the gripper assembly 22 while remaining on the pallet 214.

For example, the support assembly 21 moves towards the robot arm 4. The robot arm 4 unloads the pallet 214 carrying the glued workpiece 3 and drops it in a reception zone, e.g. serving as an input zone of a machining station. The workpiece 3 can then be machined by the machine tool, while being firmly attached to the pallet 214.

After machining, the workpiece 3 can be unglued and separated from the pallet 214, then transferred to a washing station and/or an inspection station before being transferred towards a final assembly station. The pallet 214 may be cleaned in a washing station, e.g. using a steam gun, before being returned to the storage space of the production line 1 in order to be used again by the robot arm 4.

The above steps may be repeated for gluing additional workpieces 4 on additional pallets 214.

In other embodiments, the steps described above may be executed in a different order. For example, the glue may be applied on the pallet 214 immediately after placing the pallet 214 on the support assembly and before picking the workpiece 3.

Figure 7:
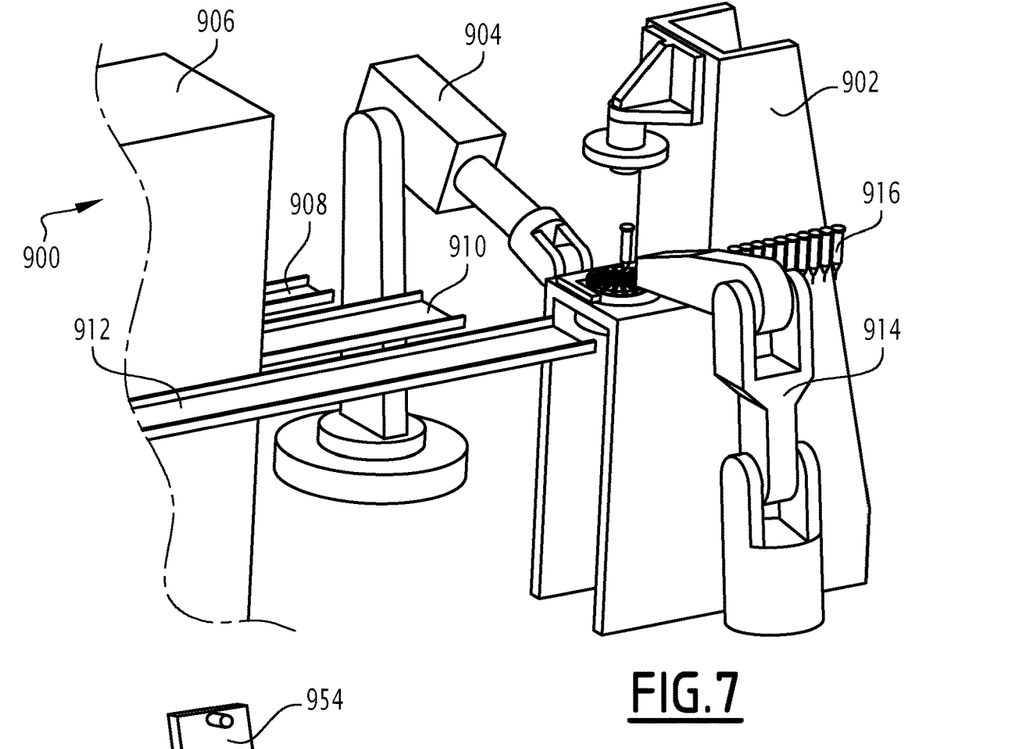
FIGS. 7 and 10 are simplified representations of an exemplary machine for gluing a workpiece according to another embodiment of the invention.

FIGS. 7 to 10 illustrate other embodiments of the invention. More precisely, FIG. 7 illustrates a portion of a production line 900, similar to the production line 1, including a machine 902 for gluing the workpiece 3 onto a pallet 960. The machine 902 plays a role comparable to the role of the machine 2. The components of the machine 902 and of the production line 900 which are similar to the components of the machine 2 and of the production line 1 bear the same numerical references and are not described in further detail, given that the description above can be transposed to these embodiments. Pallets 960, also named support elements, are adapted to receive a workpiece 3 and have the same role as the support elements 214.

The machine 902 includes a robot arm 904 comparable to the robot arm 4 or 5. The robot arm 904 is adapted to load and unload workpieces 3 and pallets 960 from a feeding station 906. For example, workpieces 3 are brought on a first feeder conveyor 908 and pallets 960 are brought on a second feeder conveyor 910. In this example, the robot arm 904 is also adapted, once the gluing steps are completed, to place the workpiece 3 glued on the pallet on a return conveyor 912. The return conveyor 912 moves glued workpieces 3 towards the machining station. The machine 902 further includes an electronic control unit, not illustrated, similar to the control unit 6. The machine may also include a measurement system similar to the measurement system 24.

The machine 902 includes a glue dispenser system 914 which comprises a robot arm adapted to handle individual glue containers 916, such as single-use glue containers.

For example, each glue container 916 stores a predefined amount of glue sufficient for gluing one or several workpieces 3, and also includes a nozzle for dispensing glue. The robot arm of the glue dispenser system 914 is adapted to pick a glue container 916 from a reserve, for example from a dedicated conveyor line, and then to move the glue container 916 so as to approach the nozzle from the region where the glue must be applied. The robot arm is also adapted to actuate the glue container 916 to apply glue, e.g. by squeezing the glue container 916. For example, the robot arm of the glue dispenser system 914 includes a holding tool, such as jaws. The glue is the same kind of glue as described previously.

Figure 10:
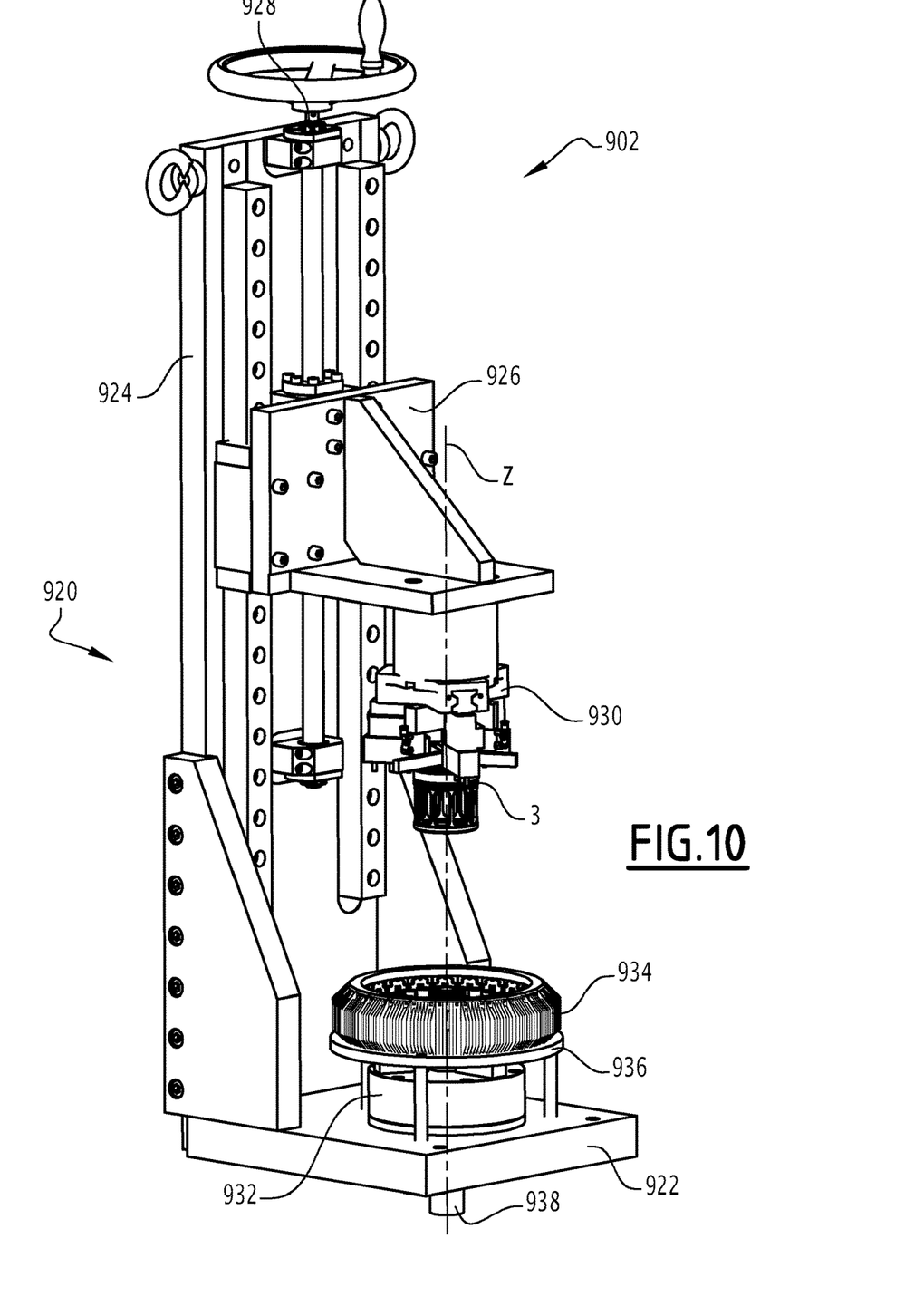

Turning now to FIG. 10, the machine 902 includes a main frame 920 comprising a base portion 922 and a vertical portion 924 extending parallel to a vertical axis Z.

A movable element 926 is mounted on the vertical portion 924 and is adapted to move in translation along the vertical axis Z relative to the vertical portion 924 between a raised position and a lowered position. For example, the vertical portion 924 includes a guiding system, such as rails, for guiding the movable element 926.

The machine 902 also includes a traction unit 928 for powering the displacement of the movable element 926. The traction unit 928 is preferably installed on the frame 902 although, in other embodiments, the traction unit 928 is installed on the movable element 926. For example, the traction unit 928 includes an actuator controlled by the control unit of the machine 902, such as an electrical motor. The traction unit 928 may also include a transmission device for transmitting the rotation movement of an output shaft of the electrical motor into a translation movement, such as a ball screw. As an alternative, as illustrated, the traction unit 928 may be manually powered, for example using a ball screw manually actuated by a crank.

The machine 902 includes a gripper assembly 930 mounted on the movable element 926. The gripper 930 has a function similar to the function of the gripper assembly 22 previously described. More precisely, the gripper assembly 930 is adapted to hold the workpiece 3 after it has been loaded in the machine 902 by the robot arm 904, and also to move the workpiece 3 in translation along the Z axis.

The machine 902 further includes an air chuck 932 mounted on the base portion 922 and adapted to clamp a pallet 960 in a fixed position, centered on the Z axis. For example, the air chuck 932 is a high-precision air chuck with three jaws. The base portion 922 and the air chuck 932 thus serve as a support assembly for receiving the pallet 960. In this example, this support assembly is fixed relative to the main frame 920.

The machine 902 further includes an outer lighting structure 934 attached to the base portion 922, for example mounted on an elevated support plate 936 connected to the base portion 922 and placed above the air operated chuck 932, and an inner lighting structure 938, movable in translation along the Z axis. The lighting structures 934 and 938 form a lighting system which has the same role as the lighting system 23.

The inner lighting structure 938 include inner lighting elements 232 which are adapted to radially illuminate the inner face of the workpiece 3, i.e. to emit light along a radial direction of the workpiece 3. The outer lighting structure 934 includes outer lighting elements 231 which are adapted to radially illuminate the outer face of the workpiece 3, i.e. to emit light along a radial direction of the workpiece 3.

In this example, the outer lighting structure 934 has an annular or toroidal shape and is aligned and centered with the Z axis. For example, an essentially cylindrical wall surrounds a central hollow portion around the Z axis. When the mobile element 926 is in the lowered position, the workpiece 3 is received inside the outer lighting structure 934, for example in the central hollow portion of the outer lighting structure 934. The outer lighting elements 232 are installed along the inner face of the wall. Preferably, the vertical position of the outer lighting elements 232 is coincident with the region where the applied glue is located, i.e. vertically coincident with the gap between the pallet 960 and the glued face of the workpiece 3.

In this example, the inner lighting structure 938 has an annular or toroidal shape and is aligned with the Z axis. The inner lighting structure 938 has a smaller radius than the radius of the outer lighting element 934. The inner lighting structure 938 is movable, along the Z axis, between a retracted position and an upper position. In the upper position, the inner lighting structure 938 is axially aligned with the outer lighting structure 934. For example, the chuck 932 and the plate 936 include a central orifice centered on the Z axis allowing the passage of the inner lighting structure 938. In the retracted position, the inner lighting structure 938 is no longer aligned with the outer lighting structure 934. For example, in the retracted position, the inner lighting structure 938 is retracted into a cavity of the base portion 922.

One understands that the dimensions of the inner and outer lighting structures 934 and 938 are chosen so as to be compatible with the radiuses of the workpiece 3. When the workpiece 3 is in contact with the pallet 960 on the chuck 932, the workpiece 3 radially surrounds the inner lighting structure 938 and the outer lighting structure 934 radially surrounds the workpiece 3.

Figures 8, 9:
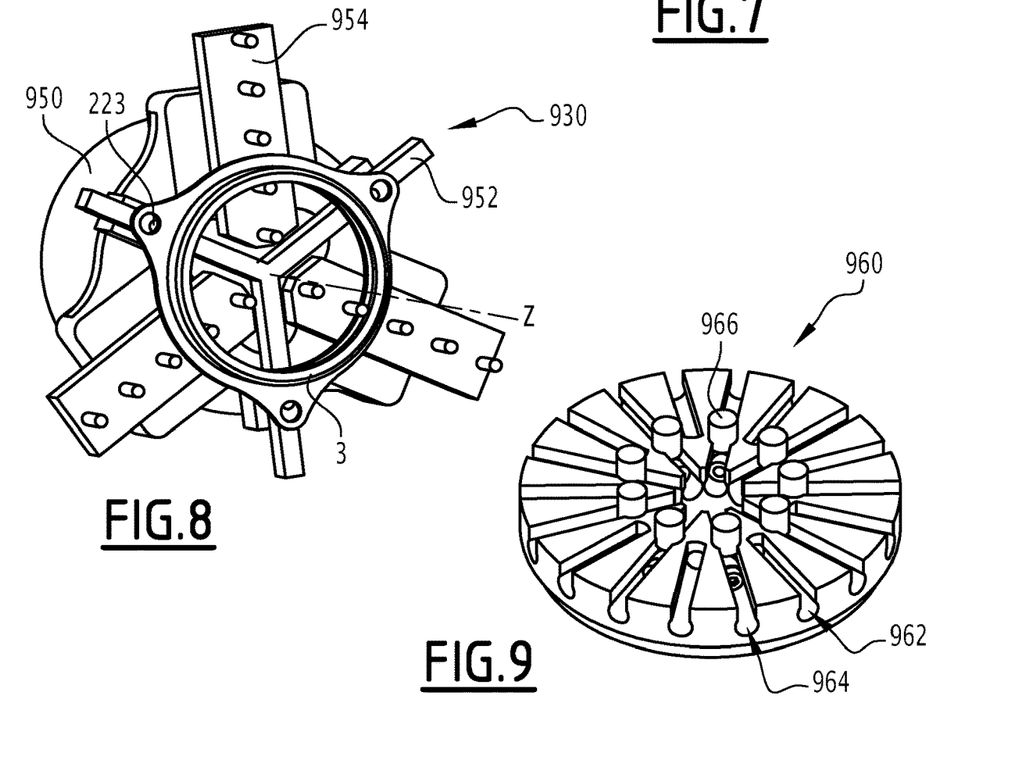
FIG. 8 is a simplified representation of another embodiment of the gripper assembly of FIG. 3.
FIG. 9 is a simplified representation of another embodiment of the pallet of FIG. 5.

FIG. 8 illustrates an exemplary embodiment of the gripper assembly 930. The gripper assembly 930 includes a base portion 950 attached to the movable element 926, a set of first arms 952 and a set of second arms 954 attached to the base portion 950. The first arms 952 are aligned and arranged on a lower face of the base portion 950 and extend radially from a center of the lower face towards the periphery of the gripper assembly 930.

For example, the center is aligned on the Z axis. The lower face is turned towards the base portion 920 and the chuck 932. In this example, there are three first arms 952 arranged in a star pattern, being evenly spaced from each other with an angle of 120°. For example, this arrangement is similar to the arrangement of the arms 221.

Preferably, the first arms 952 include means to retain the workpiece 3 with a defined force. In some embodiments, each first arm 952 includes a magnet assembly 223.

The second arms 954 are also aligned, preferably with the first arms 952, and extend radially from the center towards the periphery of the gripper 930. In the illustrated example, each second arm 954 is located between two first arms 952.

In the illustrated example, the second arms 954 include protruding pins 956 which are regularly spaced along the second arms 954. For example, the workpiece 3 may come in abutment against some pins 956 when mounted on the gripper 930. The pins 956 allow a better centering of the workpiece 3 along the Z axis by delimiting.

FIG. 9 illustrates an embodiment of the pallet 960. The pallet 960 is flat and disc-shaped.

The pallet 960 includes, on one of its main faces, a first set of radial grooves 962 and a second set of radial grooves 964. For example, radial grooves 964 extend from the peripheral edge of the pallet 960 towards the center of the main face, where they lead into a central hollow cavity of the pallet 960. The central hollow cavity allows the passage of the inner lighting structure 938. Radial grooves 962 extend from the peripheral edge of the pallet 960 towards the center of the main face. However, the radial grooves 962 do not extend into the central hollow cavity. For example, the radial grooves 962 are shorter than the radial grooves 964 and are closed by a distal wall. As an example, radial grooves 962 alternate with the radial grooves 964. Radial grooves 962 are evenly spaced from each other. Similarly, radial grooves 964 are evenly spaced from each other.

Support members 966, such as pins or steel bolts, are inserted in the second radial grooves 964 and protrude from the main face of the pallet 960. The support members 966 are adapted to support the workpiece 3. In other words, the workpiece 3 is actually meant to be glued onto the support members 966. For example, when the pallet 960 is mounted on the machine 920, its main face is perpendicular to the Z axis and faces the gripper assembly 930. The reunion of the respective upper surfaces of the support members 966 thus serves as a gluing surface for the pallet 960. The support members 966 are preferably arranged on a circle centered on the Z axis and having a radius corresponding to the radius of the workpiece 3.

Preferably, the pallet 960 is arranged so as to provide a clearance comprised between 0.5 mm and 1 mm between the glued face of the workpiece 3 and the pallet gluing surface, this clearance being measured along the Z axis. For example, in some embodiments, the support pallet 960 may include support pins, not pictured, that are received in grooves 962 or 964. The support pins are slightly longer than the support members 966, allowing the workpiece 3 to rest directly on the support pins while keeping a non-zero clearance between the support members 966 and the glued face of the workpiece 3. By "slightly longer", it is meant that the support pins extend further along the Z axis than the support members 966, e.g. by less than 1 mm.

The clearance prevents the workpiece 3 from crushing and spreading the applied glue 7 before it has time to dry. The clearance also allows a precise setting of the thickness of the layer of applied glue 7.

In some embodiments, the clearance can be set prior to gluing the workpiece 3. For example, the height of the support pins can be set prior to the gluing operations, e.g. by screwing or unscrewing the support pins in the grooves 962 or 964. In some embodiments, the pallet 960 does not include dedicated support pins and, instead, some of the support members 966 are used as support pins and do not receive any glue. In other words, the height of at least some of the support members 966 can be set higher than the height of the other support members 966 onto which the glue 7 will be applied. The height of the higher support pins will define the axial—Z axis—position of the ring, unaffected by the glue layer on the lower pins.

In some other embodiments, the pallet 214 can be used instead. In that case, the machine 920 is adapted in consequence, for example to replace the chuck 932 with the chuck 2144.

Operation of the machine 902 is now briefly described. One understands that the method described in reference to the first embodiment can be transposed to this second embodiment and that only the differences due to the constructions differences between the machines 902 and 2 are described in detail below.

For example, the robot arm 904 first picks a pallet 960 from the conveyor 910 and places it onto the chuck 932 of the base portion 922, where it is clamped by the chuck 932.

The robot arm 904 then picks a workpiece 3 to be machined from the conveyor 908 and brings it towards the gripper 930. Preferably, at this stage, the mobile element 926 is in the raised position. The workpiece 3 is then attached to the gripper 930 and is preferably automatically centered on the Z axis, for example using the magnet assemblies 223 and/or the protruding pins 956. After that, the robot arm 904 steers away from the gripper 930.

The gluing machine 914 applies glue from a glue container 916 onto the support pieces 966 of the pallet 960. The mobile element 926 is lowered until the workpiece 3 comes into contact with the pallet 960, along the face of the pallet 960 comprising the applied glue.

Then, the inner lighting structure 938 is placed in its upper position, in alignment with the workpiece 3 and with the outer lighting structure 934. The applied glue is illuminated, by illuminating with UV light the inner and outer radial faces of the workpiece 3, using the lighting elements of the inner and outer lighting structures 934 and 938.

Once lighting is completed, the inner lighting element is lowered in the retracted position and the movable element 926 may return to its raised position. At this stage, the workpiece 3 is still attached to the gripper 930, itself associated to the mobile element 26. As the mobile element 926 moves up towards the raised position, the workpiece 3 and the glued pallet 960 move along the mobile element 926. From there, the robot arm 904 may pick the workpiece 3 glued to the pallet 960 and deposit them onto the conveyor 912. The method is repeated using a new pallet 960 and a new workpiece 3.

In other embodiments, the steps described above may be executed in a different order. For example, the glue may be applied on the pallet 960 immediately after placing the pallet 960 on the support assembly and before picking the workpiece 3.

The embodiments and alternatives described above may be combined with each other in order to generate new embodiments of the invention.

For example, in some embodiments, the glue dispenser system 25 may be used in the machine 902 instead of the glue dispenser 914. Similarly, the glue dispenser 914 and the glue containers 916 may be used in the machine 2 in place of the glue dispenser system 25.

What is claimed is:

1. A machine for gluing a ring-shaped workpiece prior to machining operations, the machine comprising:

a support assembly adapted to receive a removable support element having a top surface for receiving the ring-shaped workpiece;

a glue dispenser system adapted to apply a predefined amount of glue on a face of at least one of the ring-shaped workpiece and the support element;

a gripper assembly for placing the ring-shaped workpiece on the support element;

an illuminating system adapted to illuminate the applied glue with ultraviolet light, this illuminating system including:

at least one inner lighting element for radially illuminating an inner radial face of the ring-shaped workpiece with ultraviolet light, and at least one outer lighting element for radially illuminating an outer radial face of the ring-shaped workpiece with ultraviolet light.

2. The machine according to claim 1, wherein the applied glue is high viscosity ultra-violet light-activated glue.

3. The machine according to claim 1, wherein the inner and outer lighting elements each include an ultraviolet light source comprising one or several fluorescent lamp tubes, or light-emitting diodes, or halogen lamps, or gas-discharge lamps.

4. The machine according to claim 1, wherein the illuminating system includes an inner lighting structure including at least one inner lighting element and an outer lighting structure including at least one outer lighting element, the inner and outer lighting structure having an annular or toroidal shape, the inner lighting structure having a smaller radius than the outer lighting element, the inner and outer lighting structures being adapted to be aligned with the ring-shaped workpiece around a same alignment axis.

5. The machine according to claim 1, wherein the gripper assembly includes an arm provided with at least one magnetic element for exerting a magnetic force on at least a portion of the ring-shaped workpiece, in order to attract and hold the ring-shaped workpiece attached to the gripper assembly.

6. The machine according to claim 1, further comprising a measurement system adapted to detect a position error of the ring-shaped workpiece relative to the support element, the measurement system including at least one position measurement device comprising optical recognition means that includes an image sensor or a light sensor.

7. The machine according to claim 1, further comprising a robotic arm for loading and unloading the support element and/or for loading and unloading the ring-shaped workpiece.

8. The machine according to claim 1, wherein the ring-shaped workpiece is a metal ring meant to be used in a ball bearing.

9. An industrial production line comprising: a gluing machine, and a machining tool, the gluing machine being adapted to glue a ring-shaped workpiece to be machined onto a removable support element prior its transfer to the machining tool, the machining tool being adapted to perform machining operations on the ring-shaped workpiece glued to the support element, the gluing machine according to claim 1.

10. A method for gluing a ring-shaped workpiece prior to machining operations using the gluing machine according to claim 1, wherein this method includes:

a) providing a removable support element having a top surface for receiving the ring-shaped workpiece and placing the support element on the support assembly;

b) providing the ring-shaped workpiece to be machined;

c) gluing the ring-shaped workpiece to the support element, by:
applying a predefined amount of glue on a face of at least one of the ring-shaped workpiece and the support element, using the glue dispenser system;
bringing in contact the ring-shaped workpiece with the support element, along the face comprising the applied glue, using the gripper assembly;
d) illuminating the applied glue with ultraviolet light, using the illuminating system, by radially illuminating both the inner radial face and the outer radial face of the ring-shaped workpiece, respectively using an inner lighting element and an outer lighting element of the illuminating system.

* * * * *